United States Patent Office 3,733,286
Patented May 15, 1973

3,733,286
COMPOSITIONS FOR PIGMENTED PAPER COATINGS WHICH CONTAIN STYRENE-ACROLEIN POLYMERS
David W. Holly, Naperville, and George T. Kekish, Chicago, Ill., assignors to Nalco Chemical Company, Chicago, Ill.
No Drawing. Filed Oct. 19, 1970, Ser. No. 82,065
Int. Cl. C08g 51/04, 51/06, 51/34
U.S. Cl. 260—17.4 ST         12 Claims

ABSTRACT OF THE DISCLOSURE

Acrolein-styrene polymers have been found effective as coatings in imparting water resistance to pigmented paper.

Introduction

Styrene-butadiene copolymers have been used for coating paper to impart water resistance to pigmented paper. It is well known in the art that paper is quite frequently coated as a means of improving its receptivity to printing inks, its optical characteristics and over-all appearance as well as to achieve various other desired properties. The major components of a paper coating composition are ordinarily a pigment, such as clay, and a binder which serves to bind the pigment particles to one another as well as to adhere them to the surface of the paper.

There has been an increased demand for coated and paper board displaying greater resistance to water. Such water resistant papers are required for off-set printing, for frozen food containers and labels, and for many other applications where the coating is likely to come in contact with water or a damp atmosphere.

In the prior art, polyvinyl acetates, polyvinyl acrylates and styrene-butadiene have been used for paper coatings. These coatings were not entirely satisfactory. There was a need for the development of a new polymer that would form a more water resistant coating.

Objects

It is an object of this invention to provide new polymers that are useful as adhesives for paper coatings. It is another object to provide new polymers which are particularly useful in the preparation of surface coating compositions. It is a further object to provide polymers which are particularly useful for the treatment of fibrous materials, such as cloth, paper, and the like. It is a further object to prepare coated papers displaying an unusually high degree of water resistance thereby permitting the thus coated papers to be utilized in all applications wherein water or moisture are likely to be encountered.

The invention

New surface coating polymers prepared from stable aqueous latices of the invention are particularly outstanding for their use in paper coatings and are in the insolubilizing reagents of this invention. These polymers are produced from the monomers of acrolein and styrene. Usually the polymer contains from 40 to 95% styrene and from 5 to 60% acrolein. Preferred embodiments of this invention contain acrylonitrile and acrylic acid. Although acrylonitrile and acrylic acid are not necessary for the practice of this invention, their incorporation into the polymer has been found very effective. Preferably, the polymer contains from 5 to 20% acrolein, from 40 to 95% styrene, from 0 to 40% acrylonitrile, and from 0 to 2% acrylic acid. Usually the acrylic acid makes up about 1% of the composition. Preferred embodiments comprise, by weight of:

(A) from 5 to 60% acrolein;
(B) from 34.5 to 89.5% styrene;
(C) from 5 to 40% acrylonitrile; and
(D) from 0.5 to 2% acrylic acid.

Further preferred embodiments comprise, by weight of:

(A) from 15 to 50% acrolein;
(B) from 41.2 to 76.2% styrene;
(C) from 8 to 15% acrylonitrile; and
(D) from 0.8 to 1.5% acrylic acid.

Acrylic acid makes the coating more adhesive and gives stability to the latex. The most preferred embodiment of this invention comprises a polymer containing 10% acrolein, 69% styrene, 20% acrylonitrile and 1% acrylic acid. All of the percentages disclosed are weight percent unless otherwise specified.

The acrolein-styrene polymers are a great breakthrough in the art. Although acrolein terpolymers are disclosed in the prior art such as U.S. Pat. 3,231,538, polymers containing essentially acrolein-styrene substituents useful as surface coatings are unique. The use of acrolein produces a polymer containing free aldehyde groups. If too large an amount of acrolein is used, for example, over 60% by weight, the amount of free aldehyde groups decreases. This is based on the fact that the aldehyde groups coreact to form cyclic compounds. The presence of styrene or other monomers in the polymers acts to separate the aldehyde units and thus prevent the formation of cyclic rings, such as tetrahydropyrane rings. Preferably the polymer contains from 5 to 20% of acrolein. At this low range of acrolein, the amount of cyclization is minimal.

It should be understood by anyone skilled in the art that acrolein is used generically and that other unsaturated aldehydes could be used without departing substantially from the invention. For example, methacrolein, alpha-ethylacrolein, alpha-butylacrolein, alpha-chloroacrolein, beta-phenylacrolein, alpha-decylacrolein, alpha-cyclohexylacrolein and the like could be used.

The acrolein in the polymer acts to insolubilize the coating in conjunction with other ingredients in the coating. The other compounds contribute other properties to the coating. The acrolein also adds to the sheer stability, which is an important property.

The polymer reacts with the water-soluble hydroxy-containing material to form the binder. Some of the physical properties that are needed in the binder are film formation ability, moisture resistance, adhesive performance, and printability. Neither the polymer nor the water-soluble hydroxy-containing material would work alone. An actual reaction between the two compounds is needed. The binder produced by the reaction of the polymer and the water-soluble hydroxy-containing material has the desired physical properties. The coating that was formed using the compositions of this invention was tested according to the wet rub and the pick printability tests which will be discussed later.

Preparation of the polymers

The polymers are naturally prepared from the monomers using the specific monomers desired. Following is a typical synthesis of the polymer.

EXAMPLE I

To a one liter resin kettle was added 500 grams of water, 3 grams of sodium lauryl sulfate, and 0.4 gram of ammonium persulfate. Stirring was maintained at 400 revolutions per minute and the nitrogen was bubbled through the solution for 5 minutes, until foaming became excessive. After foaming had subsided, the monomers were added. The monomers consisted of 15 grams of acrolein and 135 grams of styrene. The ingredients were mixed. 0.4 gram of sodium metabisulfite was then added with 40 grams of water. A slight positive pressure of nitrogen was introduced. Five drops of tertiary butyl hydroperoxide was added. The temperature was maintained at from 35–40° C. for about 3 hours. The latex was removed to a rotary evaporator for 4 hours. The pH of the material was adjusted to 7.8 and the product stored for used.

EXAMPLE II

The same steps were followed as in Example I except that instead of adding just acrolein and styrene, acrylonitrile and acrylic acid were also added so that the final product contained 10% acrolein by weight, 69% styrene by weight, 20% acrylonitrile and 1% acrylic acid.

EXAMPLE III

One liter resin flask equipped with reflux condenser, mechanical stirrer and thermometer was evacuated and purged with nitrogen. 2 grams of sodium lauryl sulfate dissolved in 200 ml. of deionized water and 1 gram of acrylic acid were added to the resin flask. Then 10 g. of acrolein, inhibited with 100 p.p.m. of hydroquinone and 89 grams of styrene were added to this mixture with sufficient stirring to produce a good emulsion. After 5 minutes, 0.2 gram of sodium metabisulfite dissolved in 7.0 ml. of deionized water were added and after three minutes 0.04 gram of tetrabutyl hydroperoxide to initiate the polymerization.

The reaction was exothermic and the temperature was kept at about 40° C. by means of external cooling. After 2 hours the latex was cooled, and vacuum applied to remove traces of unreacted monomers. The final latex contained 33% solids. The yield was 98%.

EXAMPLE IV

The same as Example III, except amount of monomers was:

|  | G. |
|---|---|
| Acrylic acid | 1 |
| Acrolein | 10 |
| Styrene | 69 |
| Acrylonitrile | 20 |

The yield was 97%.

EXAMPLE V

The same as Example III, except the amount of monomers was:

|  | G. |
|---|---|
| Acrylic acid | 1 |
| Acrolein | 10 |
| Styrene | 79 |
| Acrylonitrile | 10 |

The yield was about 99%.

EXAMPLE VI

The same as Example III, except the amount of monomers was:

|  | G. |
|---|---|
| Acrylic acid | 1 |
| Acrolein | 15 |
| Styrene | 84 |

The yield was about 100%.

EXAMPLE VII

The same as Example III, except the amount of monomers was:

|  | G. |
|---|---|
| Acrylic acid | 2 |
| Acrolein | 10 |
| Styrene | 88 |

The yield was 97%.

Various ratios of different mixtures of the monomers and different percentages were also run.

Coating

The coating is formed by mixing the inert mineral pigment, a water-soluble hydroxy-containing material, and the polymer. The pigment is usually clay and is about a 70% dispersion. The water-soluble hydroxy-containing material is dispersed in water by thorough mixing and cooking. The water-soluble hydroxy-containing material is usually about a 20% dispersion. The polymer is made up as a 20–50% aqueous suspension, but preferably 40–50%. These three ingredients are blended together to give an aqueous suspension containing about 20 to 65% by weight solids. The ratio of clay to water-soluble hydroxy-containing material to polymer on a solids basis is usually about 100:8:8.

The water-soluble hydroxy-containing material may be any poly-hydroxy-containing water-soluble material, such as polyvinyl alcohol, hydrolyzed polyvinyl acetates, methyl cellulose, and the like, and particularly starches and starch derivatives.

The term "starch" includes any amylaceous substance such as untreated starch, as well as starch which has been treated by chemical or other means to produce oxidized, dextrinized, hydrolyzed, esterified or etherified derivatives of starch so long as the product is still essentially amylaceous in nature and still contains hydroxyl groups capable of reacting with reagents. The starches may be derived from any plant sources, including corn, high amylose corn, wavy maize, sorghum, tapioca, potato, wheat, rice and sago.

The inert mineral pigments which are applicable for use in our novel paper coating compositions may be selected from among any of the pigment materials which are ordinarily employed in paper coatings. Thus, one may employ such well known pigments as kaolin clay, calcium carbonate, and titanium dioxide. The latter pigments, as well as any others whose presence is desired by the practitioner, may be utilized either alone or in combination with one another.

The actual application of our novel paper coating compositions to a paper or paperboard substrate may be accomplished by any means convenient to the practitioner. Thus, for example, one may utilize such coating methods as the air knife, roll coater, wire wound rod, trailing blade and size press, etc. Following the application, the resulting coatings should be dried to cure the coated paper in order to effect the desired reaction between the water-soluble hydroxy-containing material and the disclosed polymer. It is this reaction which actually insolubilizes the water-soluble hydroxy-containing material and thus makes possible the high degree of water resistance displayed by the resulting coatings. The polymer reacts with the starch to form the binder. In curing the thus coated paper, it may be merely stored at ambient temperatures for a period of from 1 to 7 days. On the other hand, the cure may be accelerated by heating the paper in the drier section of the paper coater. Curing may also be accelerated by addition of appropriate catalysts which act as curing agents. Typical curing agents could be acid or caustic, and many other agents known to those skilled in the art.

Test of coatings

In order to test the coatings formed by the compositions of this invention, the wet-rub and pick printability tests were used.

The wet-rub resistance of the paper which has been coated was determined by a modification of test procedure RC–184 of the Technical Association of the Pulp and Paper Industry (TAPPI). This wet-rub resistance test is used to measure the resistance to the rubbing off of the coating after the latter has been moistened. Thus, the coated paper is subjected to rubbing under controlled conditions of pressure and wetting and the amount of coating which is removed from the paper is indirectly measured by turbidometric means such as a photometer. In this series of tests, a two inch square of the coated paper was used. The paper square was placed in 25 mls. of water for one minute. The paper square was then rubbed 20 times in one direction in a petri dish. The cloudy water was poured off into a cell and the transmittance was measured in a spectrophotometer. The transmission was then read. Naturally, the clearer the solution, the better. A reading of 0 would be the best.

The other test that was used was the IGT Pick Printability suggested test method T–499 of the Technical Association of the Pulp and Paper Industry (TAPPI). A machine is used to measure the ability of the coated surface to withstand the printing process. Picking is the phenomenon of tacky ink pulling the coating away from the surface. This is detected by the appearance of white dots along the black ink line. The results are measured in feet per minute. Naturally, a larger measurement means that the coated surface has great durability for the printing process.

The results of various coating formulations are given in the following tables.

TABLE I

| Weight percent acrolein-styrene coating: | Wet-rub |
|---|---|
| 0:100 | 26–29 |
| 5:95 | 9–14 |
| 10:90 | 5–8 |
| 15:85 | 6–10 |
| 20:80 | 11–14 |

As can readily be seen from Table I, when acrolein is present in the coating the wet-rub is substantially improved. Preferably, the insolubilizing reagent contains from 5 to 30% by weight of acrolein.

Table II shows that the insolubilizing reagents of this invention compare favorably to the expensive commercial protein latex.

TABLE II

| Sx. | Coating composition | Wet-rub | IGT pick |
|---|---|---|---|
| 1 | Standard commercial protein-latex | 5, 4 | [1] 360 |
| 2 | 100 clay: 8 ethoxylated starch: 8 acrolein: styrene: acrylic acid (10:89:1) | 9, 10 | [1] 360 |
| 3 | 100 clay: 8 ethoxylated starch: 8 styrene: butadiene: acrylic acid (60:39:1) | 20, 17 | [1] 320 |
| 4 | 100 clay: 8 ethoxylated starch: 8 acrolein: styrene: acrylonitrile (10:70:20) | 8, 9 | [1] 400 |
| 5 | 75 clay: 25 calcium carbonate: 8 ethoxylated starch: 8 acrolein: styrene: acrylic acid (10:89:1) | 9 | [2] >400 |
| 6 | 75 clay: 25 calcium carbonate: 8 ethoxylated starch: 8 styrene: butadiene: acrylic acid (60:39:1) | 18 | [2] 320 |
| 7 | 75 clay: 25 calcium carbonate: 8 ethoxylated starch: 8 acrolein: styrene: acrylonitrile: acrylic acid (10:69:20:1) | 14 | [2] 320 |
| 8 | 75 clay: 25 calcium carbonate: 16 ethoxylated starch | 52 | [2] 280 |

[1] #6 ink.
[2] #5 ink.

The coating was applied at a rate of 10% by weight of paper.

SUMMARY

In summary, compositions consisting of acrolein-styrene copolymers are effective coatings for pigmented paper. These polymers can also contain acrylonitrile and acrylic acid. According to the Wet-Rub and Pick Printability tests, these coatings showed marked superiority over coatings used in the prior art.

What we claim and desire to protect by Letters Patent is:

1. A paper coating composition comprising water, clay, a water-soluble hydroxy-containing material from the group consisting of polyvinyl alcohol, hydrolyzed polyvinyl acetates, methyl cellulose, and starch, and an insolubilizing reagent, wherein the ratio of clay:water-soluble hydroxy-containing material:insolubilizing reagent is 100:8:8; said insolubilizing reagent comprises a polymer formed by the polymerization of:
(A) from 5 to 60% acrolein;
(B) from 40 to 95% styrene;
(C) from 0 to 40% acrylonitrile; and
(D) from to 2% acrylic acid.

2. The paper coating composition of claim 1 in which the insolubilizing reagent comprises, by weight, a polymer formed by the polymerization of:
(A) from 5 to 30% acrolein; and
(B) from 70 to 95% styrene.

3. The paper coating composition of claim 1 in which the insolubilizing reagent comprises, by weight, a polymer formed by the polymerization of:
(A) from 5 to 20% acrolein; and
(B) from 80 to 95% styrene.

4. The paper coating composition of claim 1 in which the insolubilizing reagent comprises, by weight, a polymer formed by the polymerization of:
(A) 10% acrolein;
(B) 69% styrene;
(C) 20% acrylonitrile; and
(D) 1% acrylic acid.

5. The paper coating composition of claim 1 in which the ratio of inert mineral pigment, water-soluble hydroxy-containing material, and insolubilizing reagent ranges from 100:1:1 to 100:40:40 by weight.

6. The paper coating composition of claim 1 in which the insolubilizing reagent comprises, by weight, a polymer formed by the polymerization of:
(A) from 5 to 60% acrolein;
(B) from 34.5 to 89.5% styrene;
(C) from 5 to 40% acrylonitrile; and
(D) from 0.5 to 2% acrylic acid.

7. The paper coating composition of claim 1 in which the insolubilizing reagent comprises, by weight, a polymer formed by the polymerization of:
(A) from 15 to 50% acrolein;
(B) from 41.2 to 76.2% styrene;
(C) from 8 to 15 acrylonitrile; and
(D) from 0.8 to 1.5% acrylic acid.

8. The paper coating composition of claim 1 wherein the pigment material is selected from the group consisting of clay, calcium carbonate, and titanium dioxide.

9. The composition of claim 1 wherein the solids content of the coating composition ranges from about 20 to 65% by weight.

10. The composition of claim 1 wherein the water-soluble hydroxy-containing material is starch.

11. A method of insolubilizing an aqueous latex paper coating which comprises the steps of:
(A) adding to said paper coating a polymer formed by the polymerization of:
(1) from 5 to 60% acrolein;
(2) from 40 to 95% styrene;
(3) from 0 to 40% acrylonitrile;

(4) from 0 to 2% acrylic acid; and
(B) curing by storing said coated paper at ambient temperatures.

12. A method of insolubilizing an aqueous latex paper coating which comprises the steps of:
(A) adding to said paper coating a polymer formed by the polymerization of:
(1) from 5 to 60% acrolein;
(2) from 40 to 95% styrene;
(3) from 0 to 40% acrylonitrile;
(4) from 0 to 2% acrylic acid; and
(B) curing by heating said coated paper.

References Cited

UNITED STATES PATENTS

| | | | |
|---|---|---|---|
| 3,162,543 | 12/1964 | Wilkins | 117—76 |
| 3,282,866 | 11/1966 | Pohlemann et al. | 260—8 |
| 3,321,422 | 5/1967 | Houff et al. | 260—17.4 |

WILLIAM H. SHORT, Primary Examiner

L. L. LEE, Assistant Examiner

U.S. Cl. X.R.

117—155 UA, 156; 260—17 R, 17.4 CL, 29.6 B, 41 A, 41 B, 67 UA